(12) United States Patent
Kurokawa et al.

(10) Patent No.: US 8,702,153 B2
(45) Date of Patent: Apr. 22, 2014

(54) VEHICULAR DOOR

(71) Applicant: Honda Motor Co., Ltd, Tokyo (JP)

(72) Inventors: Kiyohito Kurokawa, Wako (JP); Masakazu Takahashi, Wako (JP); Itaru Genpei, Wako (JP); Shingo Hakamata, Wako (JP); Isamu Nakanishi, Wako (JP); Tomofumi Ichinose, Wako (JP); Daichi Okamoto, Wako (JP); Hakurei Watanabe, Wako (JP); Mai Kato, Haga-gun (JP); Yuji Nozawa, Haga-gun (JP); Yoshihisa Sugamata, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/711,910

(22) Filed: Dec. 12, 2012

(65) Prior Publication Data

US 2013/0168997 A1     Jul. 4, 2013

(30) Foreign Application Priority Data

Dec. 28, 2011  (JP) .................................. 2011-288717

(51) Int. Cl.
*B60J 5/04* (2006.01)

(52) U.S. Cl.
USPC ................................. 296/187.12; 296/146.6

(58) Field of Classification Search
USPC .......................................... 296/146.6, 187.12
See application file for complete search history.

(56) References Cited

U.S. PATENT DOCUMENTS 5,716,093 A * 2/1998 Sadr .......................... 296/146.6

FOREIGN PATENT DOCUMENTS

| JP | 6-1145 A | 1/1994 |
|----|----------|--------|
| JP | 6-270681 A | 9/1994 |
| JP | 3001173 B2 | 1/2000 |

\* cited by examiner

*Primary Examiner* — Dennis Pedder
(74) *Attorney, Agent, or Firm* — Westerman, Hattori, Daniels & Adrian, LLP

(57) ABSTRACT

Provided is a vehicular door including a load transfer member. The load transfer member includes a transfer member body disposed in a wide-thickness portion in a door body, and a projection projecting downward from the transfer member body. The transfer member body has a lower region whose surface on a door-outer-panel side abuts on, or comes close to, the inner surface of the door outer panel, and an inclined region whose door-outer-panel side surface is inclined to come apart from the door outer panel and whose surface on a door-inner-panel side abuts on, or comes close to, the inner surface of the door inner panel. The thickness of the lower region and the inclined region in a door-thickness direction is set narrower than the width of an insertion portion between the door inner panel and a door beam.

7 Claims, 10 Drawing Sheets

FIG. 3
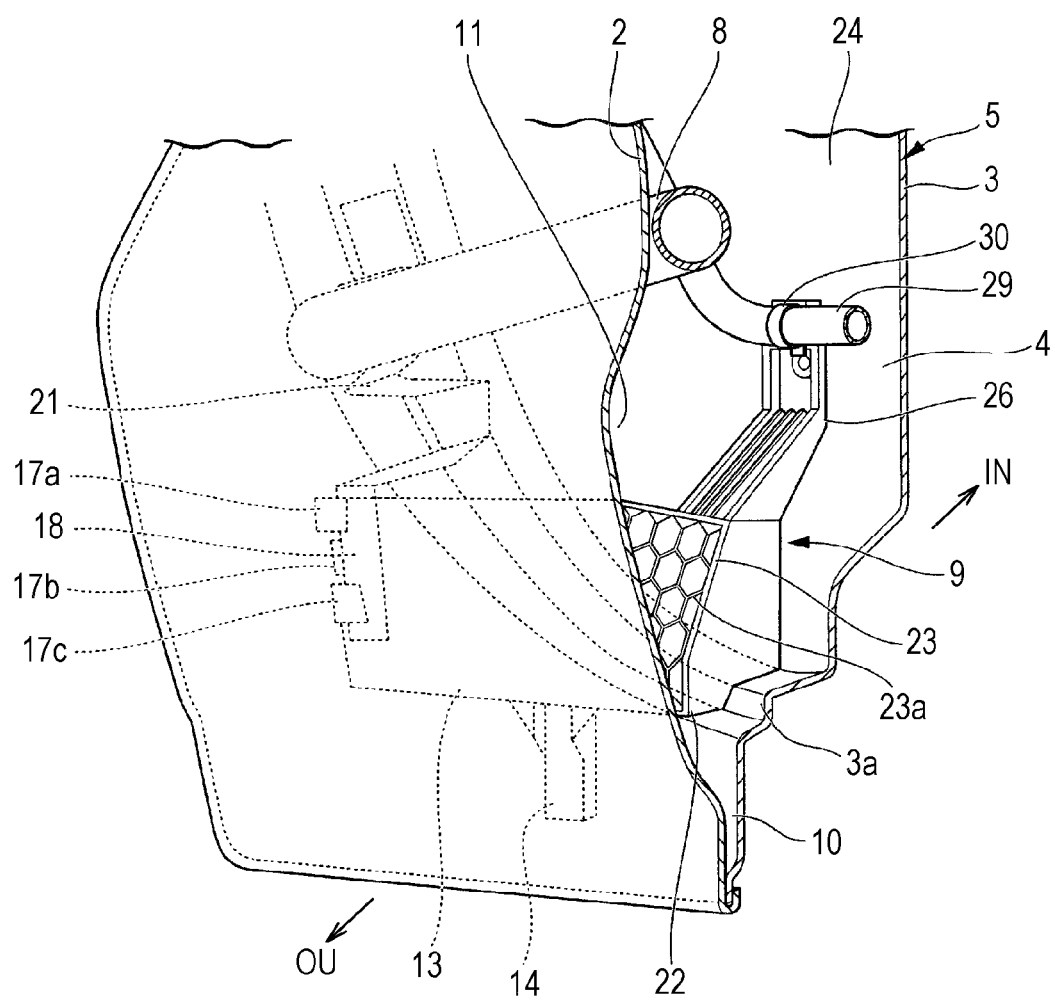
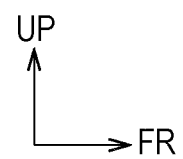

VEHICULAR DOOR

CROSS REFERENCES TO RELATED APPLICATIONS

The present application claims priority under 35 U.S.C. §119 to Japanese Patent Application No. 2011-288717, filed Dec. 28, 2011, entitled "Vehicular Door." The contents of this application are incorporated herein by reference in their entirety.

TECHNICAL FIELD

The present disclosure relates to a vehicular door having a load transfer member disposed therein, especially in a door body thereof.

BACKGROUND

There is known a vehicular door that has a load transfer member disposed between a door outer panel and a door inner panel which constitute a door body, so that when an impact load is applied to the door outer panel from outside a vehicle body, the load is transferred to the door inner panel and frame members of the vehicle body through the load transfer member (see, for example, Japanese Unexamined Patent Application Publication No. 6-270681 and Japanese Patent No. 3001173).

The vehicular door described in Japanese Unexamined Patent Application Publication No. 6-270681 is configured in such a way that the projection of the load transfer member (pad) is fitted in the recess provided in the lower end of the door body, and the upper portion of the load transfer member is fixed to the inner surface of the door outer panel by a double-sided adhesive tape.

The vehicular door described in Japanese Patent No. 3001173 is configured in such a way that the load transfer member is fixed to the inner surface of the door inner panel at a lower region in the hollow portion of the door body so as to substantially fill in the space between the door outer panel and the door inner panel.

According to the vehicular doors of the related arts, however, if a door beam is disposed in the door body for reinforcement, the load transfer member may interfere with the door beam to make its insertion into the door body difficult at the time of mounting the load transfer member in the lower region in the door body from above the door beam.

When the door beam is disposed in the vicinity of the lower region in the door body, particularly, the load transfer member is likely to interfere with the door beam at the time of inserting the load transfer member.

SUMMARY

Accordingly, it is desirable to provide a vehicular door that can be easily inserted in the door body without interference of the load transfer member with the door beam, thereby improving the workability of mounting the load transfer member.

To overcome the foregoing problem, a vehicular door according to one aspect of an exemplary embodiment of the disclosure employs the following configuration. In the following explanation of the exemplary embodiment, specific elements with their reference numerals are indicated by using brackets. These specific elements are presented as mere examples in order to facilitate understanding, and thus, should not be interpreted as any limitation to the accompanying claims.

The vehicular door according to the aspect of the exemplary embodiment of the disclosure includes a door body (e.g., door body 5 in the exemplary embodiment) having a door inner panel (e.g., door inner panel 3 in the exemplary embodiment) and a door outer panel (e.g., door outer panel 2 in the exemplary embodiment) whose peripheral portions are joined to form a hollow portion (e.g., hollow portion 4 in the exemplary embodiment) therein, the door body having a narrow-thickness portion (e.g., narrow-thickness portion 10 in the exemplary embodiment) located in a region near a lower end of the door body and narrow in a door-thickness direction of the door body, and a wide-thickness portion (e.g., wide-thickness portion 11 in the exemplary embodiment) located above the narrow-thickness portion and wider than the narrow-thickness portion in the door-thickness direction, a door beam (e.g., lower door beam 8 in the exemplary embodiment) extending in a door-widthwise direction of the door body, and a load transfer member (e.g., load transfer member 9 in the exemplary embodiment) disposed in a lower region of the hollow portion of the door body to transfer an impact load applied from outside the door body to the door inner panel. The load transfer member has a transfer member body (e.g., transfer member body 13 in the exemplary embodiment) disposed in the wide-thickness portion and a projection (e.g., projection 14 in the exemplary embodiment) projecting downward from the transfer member body and securely held in the narrow-thickness portion. The transfer member body has a lower region (e.g., lower region 22 in the exemplary embodiment) whose one side surface in the door-thickness direction abuts on, or comes close to, one of the door outer panel and the door inner panel, and an inclined region (e.g., inclined region 23 in the exemplary embodiment) whose one side surface in the door-thickness direction is inclined to come apart from the one of the door outer panel and the door inner panel, and whose other side surface in the door-thickness direction abuts on, or comes close to, the other one of the door outer panel and the door inner panel. A thickness of the lower region and the inclined region in the door-thickness direction is set narrower than a width of an insertion portion (e.g., insertion portion 24 in the exemplary embodiment) between one of the door inner panel, and the door outer panel and the door beam.

According to this configuration, the thickness of the lower region and the inclined region in the door-thickness direction is set narrower than the width of the insertion portion between one of the door inner panel and the door outer panel, and the door beam, so that the load transfer member can be mounted in the lower region in the door body without interfering with the door beam. When the load transfer member is mounted in the door body, the projection of the load transfer member is securely held in the narrow-thickness portion of the door body, and one side surface of the lower region of the transfer member body in the door-thickness direction abuts on, or comes close to, one of the door outer panel and the door inner panel, and an inclined region (e.g., inclined region 23 in the exemplary embodiment) whose one side surface in the door-thickness direction is inclined to come apart from the one of the door outer panel and the door inner panel, and the other side surface of the inclined region of the transfer member body in the door-thickness direction abuts on, or comes close to, the other one of the door outer panel and the door inner panel.

According to the aspect of the exemplary embodiment of the disclosure, therefore, the workability of mounting the load transfer member may be improved without sacrificing the ability to transfer an impact load.

In the vehicular door according to the aspect of the exemplary embodiment of the disclosure, it is preferable that the load transfer member should further include an engagement portion (e.g., engaging claw 17*a*, 17*b*, 17*c* in the exemplary embodiment) which is provided on one end side of the transfer member body in the door-widthwise direction thereof and should be securely engaged with a fixing portion (e.g., fixing piece 18 in the exemplary embodiment) of the door body in the hollow portion of the door body, and the one side surface of the inclined region of the transfer member body should be inclined to come apart from the one of the door outer panel and the door inner panel as the one side surface goes farther apart from the engagement portion, preferably in the door-widthwise direction.

According to this configuration, one side surface of the inclined region of the transfer member body in the door-thickness direction is inclined to come apart from one of the door inner panel and the door outer panel toward the upper side and the other end in the door-widthwise direction. This makes it possible to easily mount the load transfer member in the mount position in the door body while engaging the engagement portion on one end side of the load transfer member in the door-widthwise direction of the door body with the fixing portion in the door body without interference of the load transfer member with the door beam. Further, the region on the upper side of the load transfer member and the region on the other end side thereof in the door-widthwise direction are not likely to interfere with the door beam when the load transfer member is first inserted in the lower region in the door body obliquely downward while holding the engagement portion facing down, and the entire load transfer member is rotated and displaced to come close to the final mount state while setting the engagement portion closer to the fixing portion in the door body.

In the above vehicular door, the transfer member body is preferably provided with an abutting surface (e.g., abutting surface 25 in the exemplary embodiment) which abuts on the one of the door outer panel and the door inner panel in a region extending from a corner of the transfer member body on one end side in the door-widthwise direction thereof and a lower side thereof.

According to this configuration, the transfer member body abuts on one of the door outer panel and the door inner panel over a comparatively wide range. It is also possible to sufficiently secure the abutment area of the transfer member body with respect to one of the door outer panel and the door inner panel to enhance the load transfer efficiency when an impact load is applied.

In the vehicular door, the load transfer member preferably includes a fastening portion (e.g., nut 28 in the exemplary embodiment) which is fastened to the door body by a fastening member (e.g., bolt 27 in the exemplary embodiment), on an other end side of the transfer member body in the door-widthwise direction and on an upper side thereof.

According to this configuration, the load transfer member is fastened to the door body at a position farthest from the projection and the engagement portion which are to be engaged with the door body. Therefore, the mount rigidity of the entire load transfer member can be enhanced.

In this vehicular door, the fastening portion is preferably provided on an extending portion (e.g., extending portion 26 in the exemplary embodiment) extending upward from the transfer member body, and having a harness engaging portion (e.g., harness engaging piece 30 in the exemplary embodiment) to engage with a harness (e.g., harness 29 in the exemplary embodiment) in the door body at a position higher than the fastening portion.

According to this configuration, the harness in the door body can be engaged with the door body with high support rigidity in the vicinity of the portion where the load transfer member is fastened to the door body, without providing an exclusive mount hole for fixing the harness in the door body.

In the vehicular door, the fixing portion of the door body is preferably formed integrally with a beam bracket (e.g., beam bracket 21 in the exemplary embodiment) which is formed by a metal plate to fix an end portion of the door beam to the door body.

This configuration can reduce the number of parts and can simplify the internal structure of the door body.

In the vehicular door according to the aspect of the exemplary embodiment of the disclosure, the inclined region of the transfer member body preferably has an inclined surface (e.g., inclined surface 23*a* in the exemplary embodiment) provided on a side facing the door outer panel, and a proximity surface abutting on, or close to, the door inner panel.

This configuration makes it possible to sufficiently secure a large abutment area for the transfer member body on the door inner panel side when an impact load is applied, thereby enhancing the load transfer efficiency to the vehicle body.

BRIEF DESCRIPTION OF THE DRAWINGS

The advantages of the disclosure will become apparent in the following description taken in conjunction with the following drawings.

FIG. 3 is a partly cutaway perspective view showing the vehicular door according to the exemplary embodiment of the disclosure.

DETAILED DESCRIPTION

An exemplary embodiment of the disclosure will be described below with reference to the accompanying drawings. In the diagrams, an arrow FR indicates the front direction of a vehicle, an arrow UP indicates the upper direction of the vehicle, and arrows IN and OU respectively indicate the inside and outside in the widthwise direction of the vehicle.

Figure 1:
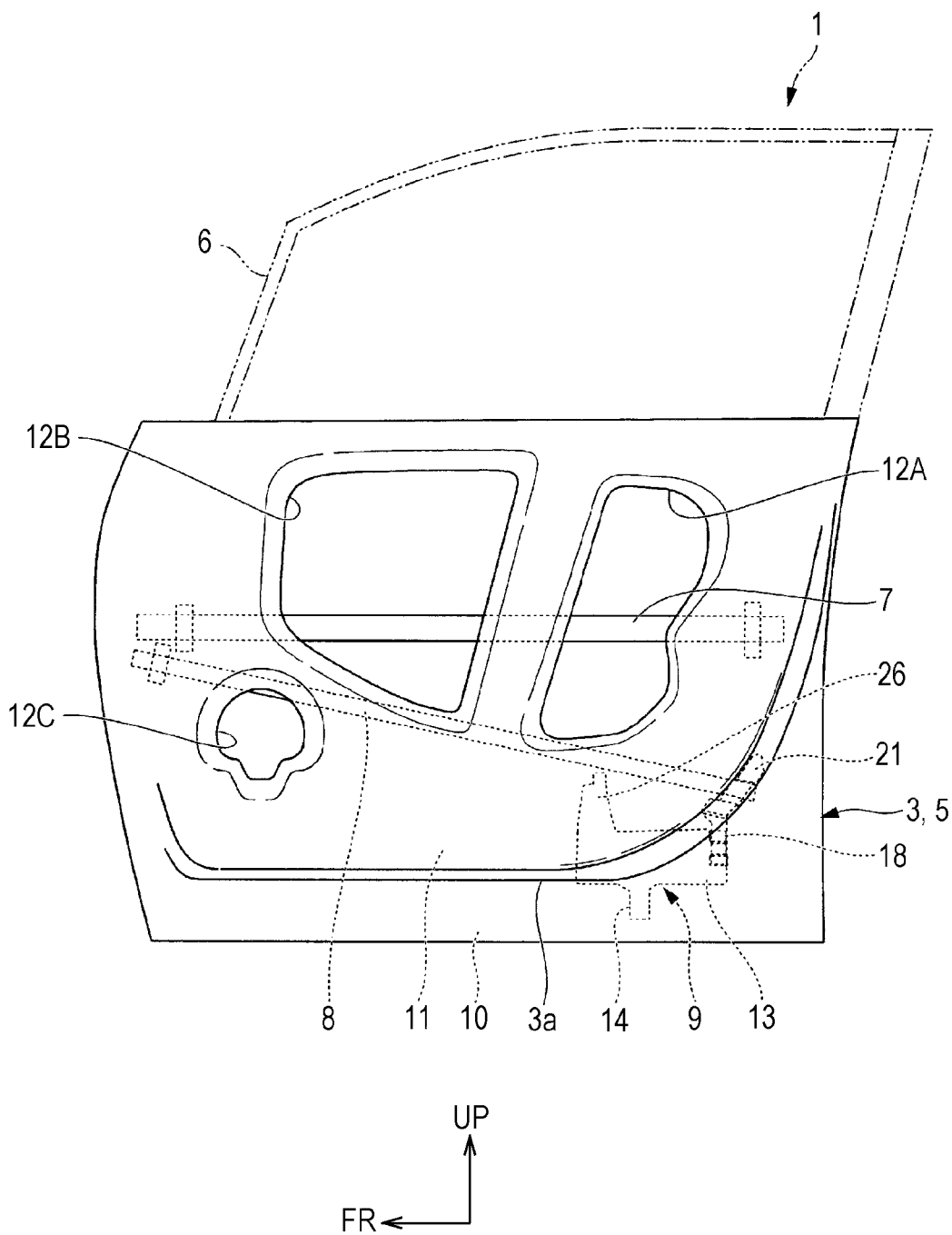
FIG. 1 is a front view of a vehicular door according to an exemplary embodiment of the disclosure, with a door outer panel removed, as seen from the direction of the interior of a vehicle.
Figure 2:
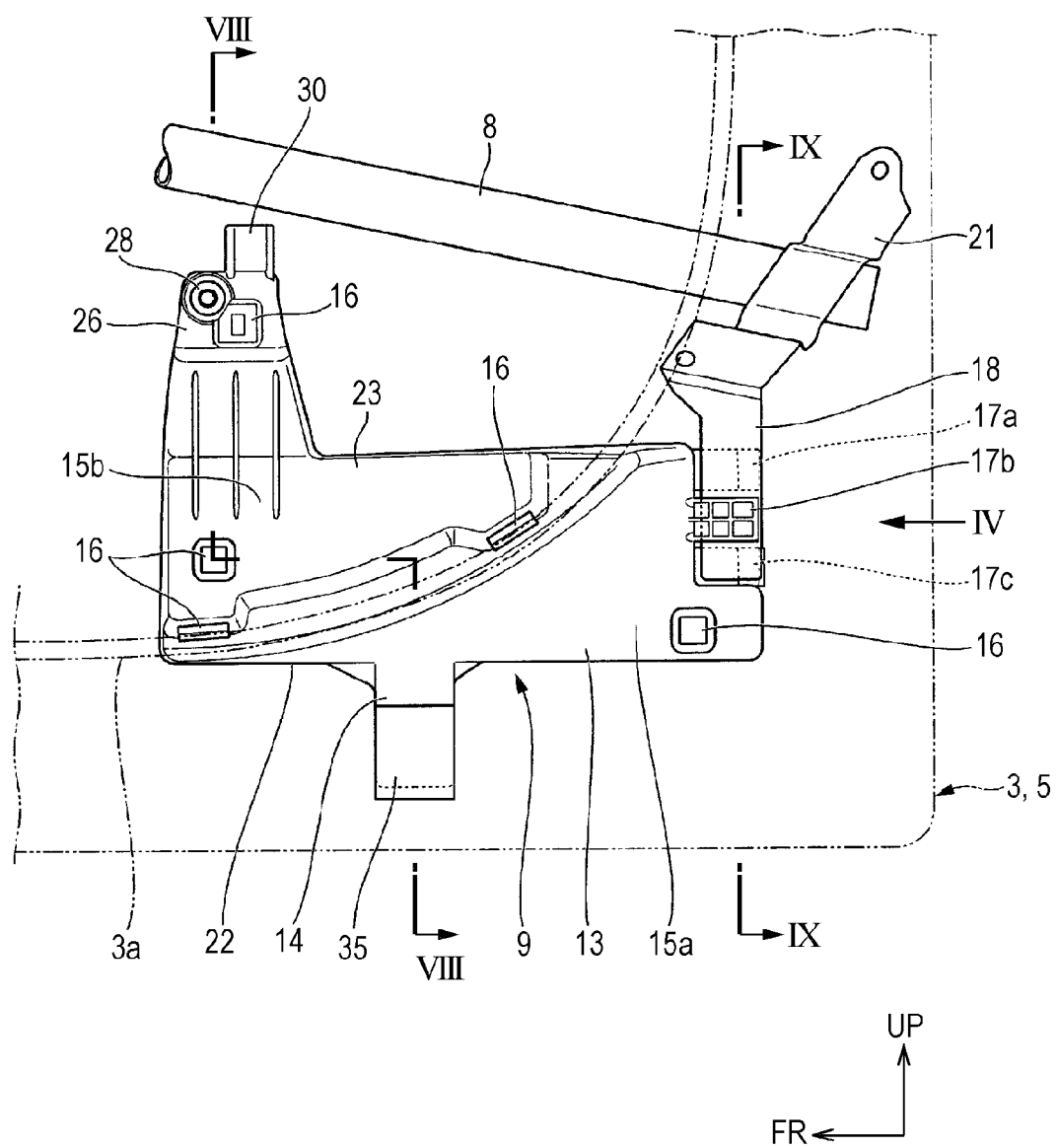
FIG. 2 is a front view of members in the door body of the vehicular door according to the exemplary embodiment of the disclosure as seen from the direction of the interior of the vehicle.

FIG. 1 is a diagram of a vehicular door 1 (hereinafter referred to as "door 1") according to the exemplary embodiment as seen from the direction of the interior of the vehicle. FIG. 2 is a diagram of members in the door 1 as seen from the direction of the interior of the vehicle. FIG. 3 is a partly cutaway perspective view showing the door 1.

As shown in those diagrams, the door 1 includes a door body 5 having a door outer panel 2 (see FIG. 3) and a door inner panel 3 whose peripheral portions are joined to provide a hollow portion 4 (see FIG. 3) therein, a door sash 6 securely mounted on the upper portion of the door body 5, an upper door beam 7 and a lower door beam 8 (door beam), which are mounted in the hollow portion 4 of the door body 5 and extend in the door-widthwise direction of the door body 5, and a load transfer member 9 which transfers an impact load, applied from outside the door body 5, to a side sill (not shown) which is a frame member of the vehicle body via the door inner panel 3.

The lower edge and the both side edges of the door outer panel 2, excluding the upper edge portion, are joined to the peripheral portion of the door inner panel 3 by hemming process. The lower edge portion and the front rear side edge portions of the door inner panel 3 stepwisely protrude inwardly toward the interior of the vehicle so that the center region protrudes most inwardly toward the interior of the vehicle. Particularly, according to the embodiment, as shown in FIGS. 1 and 3, a bent portion 3a which bends in two steps is continuously formed in a region extending from the lower edge portion of the door inner panel 3 to the side edge portion of the rear portion thereof. The bent portion 3a is formed in an arc shape as viewed from the interior of the vehicle.

Therefore, the distance between the door outer panel 2 and the door inner panel 3 (thickness in the door-thickness direction) changes stepwisely in the region extending from the lower edge portion of the door body 5 to the side edge portion of the rear portion thereof. According to the embodiment, a portion with the narrowest thickness between the outwardly lower edge portion and the outwardly side edge portion of the door body 5 in the door-thickness direction is called "narrow-thickness portion 10", and a central (upward and frontward) portion of the door body 5 which is wider than the narrow-thickness portion 10 is called "wide-thickness portion 11".

Work holes 12A, 12B, 12C which are used at the time of mounting parts inside the door body 5 or maintenance of the parts are provided in a center region of the door inner panel 3 as shown in FIG. 1.

FIGS. 4 to 10 are diagrams showing the load transfer member 9 in detail.

The substantially entire load transfer member 9 is integrally formed of a resin material. As shown in FIGS. 1 to 3, the load transfer member 9 is mounted in a rear lower region in the door body 5. The load transfer member 9 includes a thick and large-volume transfer member body 13 disposed in the wide-thickness portion 11 in the door body 5, and a rectangular plate-like projection 14 which projects downward from substantially a center of the lower end of the transfer member body 13 and is securely held in the narrow-thickness portion 10. A pad member 35 made of sponge rubber or the like is attached to the portion of the projection 14 which is inserted in the narrow-thickness portion 10.

Figure 4:
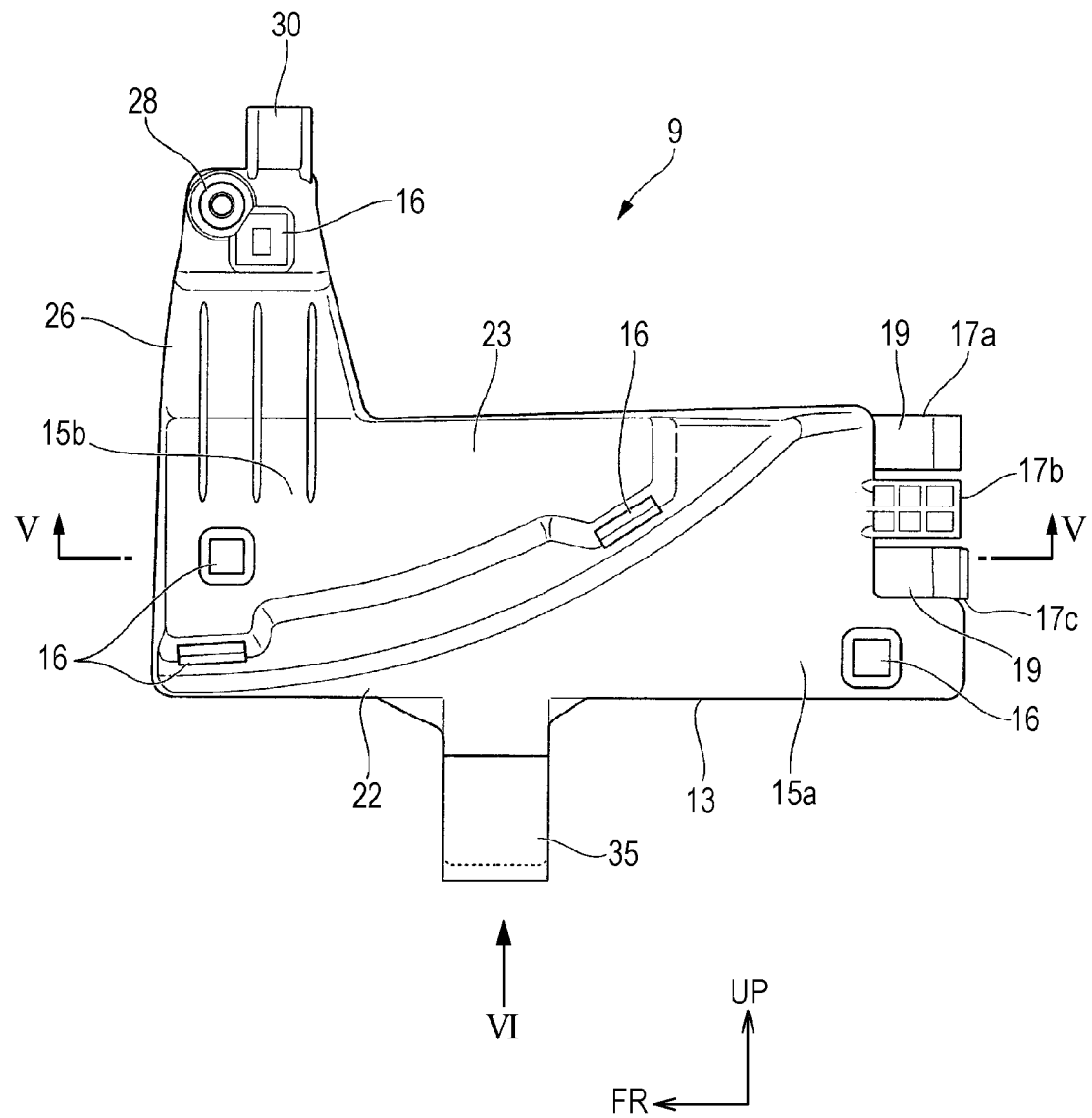
FIG. 4 is a front view of a load transfer member according to the exemplary embodiment of the disclosure as seen from the direction of the interior of the vehicle.

As shown in FIG. 4, the transfer member body 13 is formed in an elongated rectangular front shape as seen from the inside of the vehicle, and a three-step stepped surface whose ridge line forms substantially an arcuate shape which matches the shape of the bent portion 3a of the door inner panel 3 is provided on the surface on that side of the transfer member body 13 which faces the door inner panel 3 (hereinafter referred to as "inner surface"). This stepped surface is the lowest at a surface 15a including the rear lower corner (corner on one end side in the door-widthwise direction thereof and the lower side), and heaves highest in the direction of the interior of the vehicle at a surface 15b including the front upper corner (corner on the other end side in the door-widthwise direction thereof and the upper side). Pad members 16 made of sponge rubber are attached, at proper locations, to the inner surface of the transfer member body 13. Substantially entire region of the inner surface of the transfer member body 13 abuts on the inner surface of the door inner panel 3.

Figure 5:
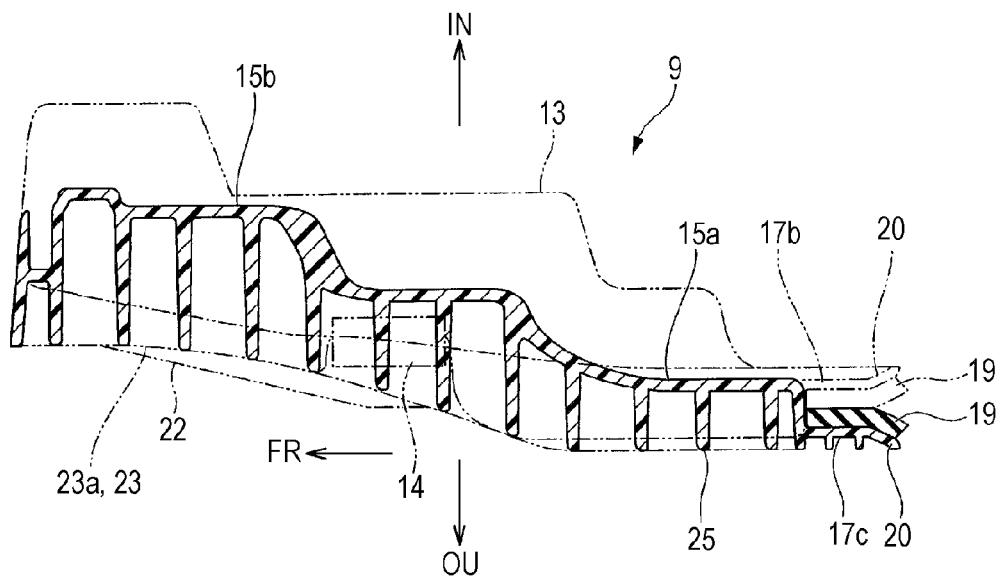
FIG. 5 is a cross-sectional view corresponding to the cross section of the load transfer member according to the exemplary embodiment of the disclosure along line V-V in FIG. 4.
Figure 6:
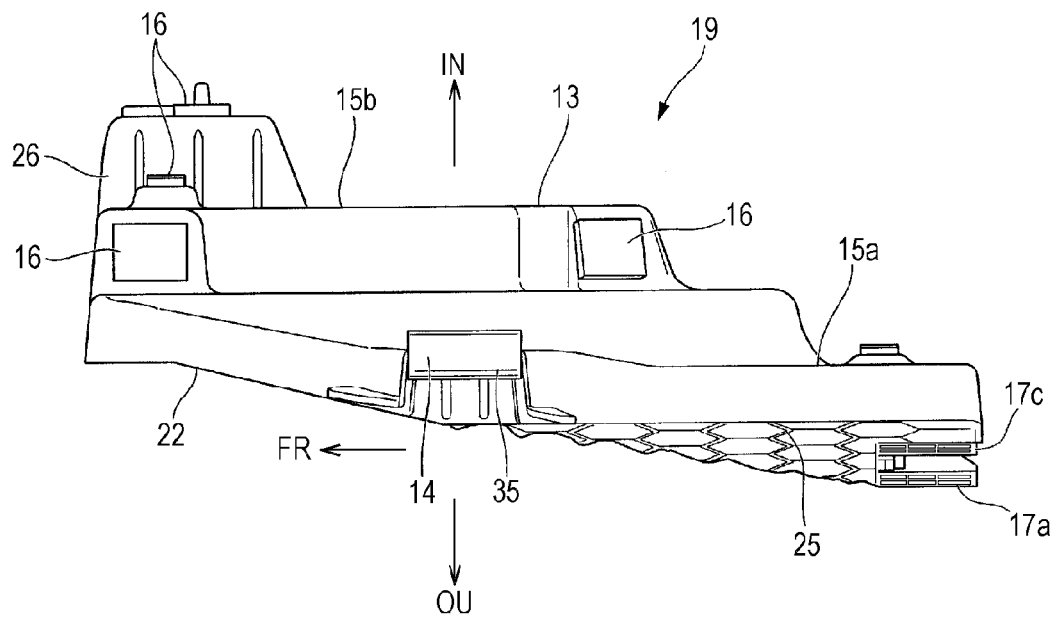
FIG. 6 is a side view of the load transfer member according to the exemplary embodiment of the disclosure as seen from the direction of an arrow VI in FIG. 4.
Figure 9:
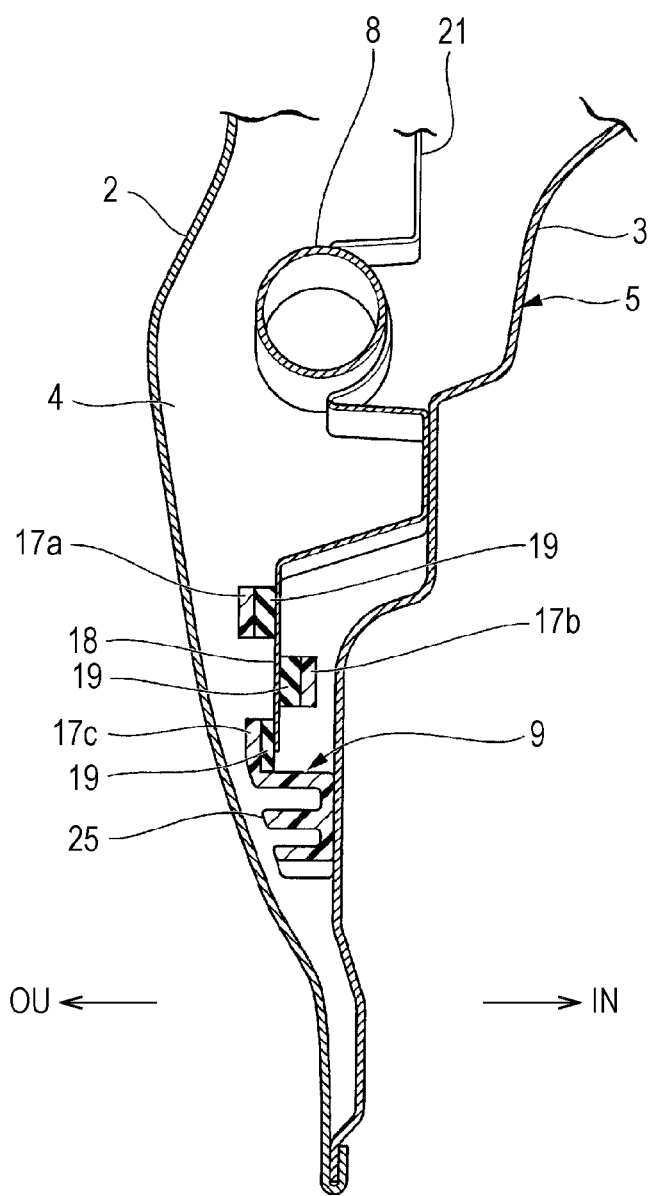
FIG. 9 is a cross-sectional view corresponding to the cross section of the vehicular door according to the exemplary embodiment of the disclosure along line IX-IX in FIG. 2.

Three engaging claws 17a, 17b, 17c (engagement portion) with substantially rectangular shapes are protrusively provided on the upper rear edge portions (one end portion in the door-widthwise direction) of the transfer member body 13 side by side in an up-down direction. The central engaging claw 17b and the upper and lower engaging claws 17a, 17c are arranged apart from each other in the thickness direction of the transfer member body 13. As shown in FIG. 9, those engaging claws 17a, 17b, 17c are securely engaged with a fixing piece 18 (fixing portion) of the door body 5. Pad members 19 made of sponge rubber or so are fixed to the respective engaging claws 17a, 17b, 17c which hold the fixing piece 18 through the pad members 19. As shown in FIG. 5, each engaging claw 17a, 17b, 17c is provided with a guide wall 20 whose rear edge is inclined outward, so that the fixing piece 18 can easily be received from the guide wall 20 at the time of installing the load transfer member 9.

The fixing piece 18 which is held by the engaging claws 17a, 17b, 17c is formed by a rectangular metal piece, which is formed integral with a beam bracket 21 made by a metal plate to fasten the rear end portion of the lower door beam 8 to the door inner panel 3 as shown in FIGS. 2, 3 and 9.

Further, the transfer member body 13 is also formed in an elongated rectangular front shape as seen from the outside of the vehicle, and a plurality of honeycomb holes are formed in the surface on that side of the transfer member body 13 which faces the door outer panel 2 (hereinafter referred to as "outer surface") to satisfy both weight reduction and maintenance of the strength.

Figure 8:
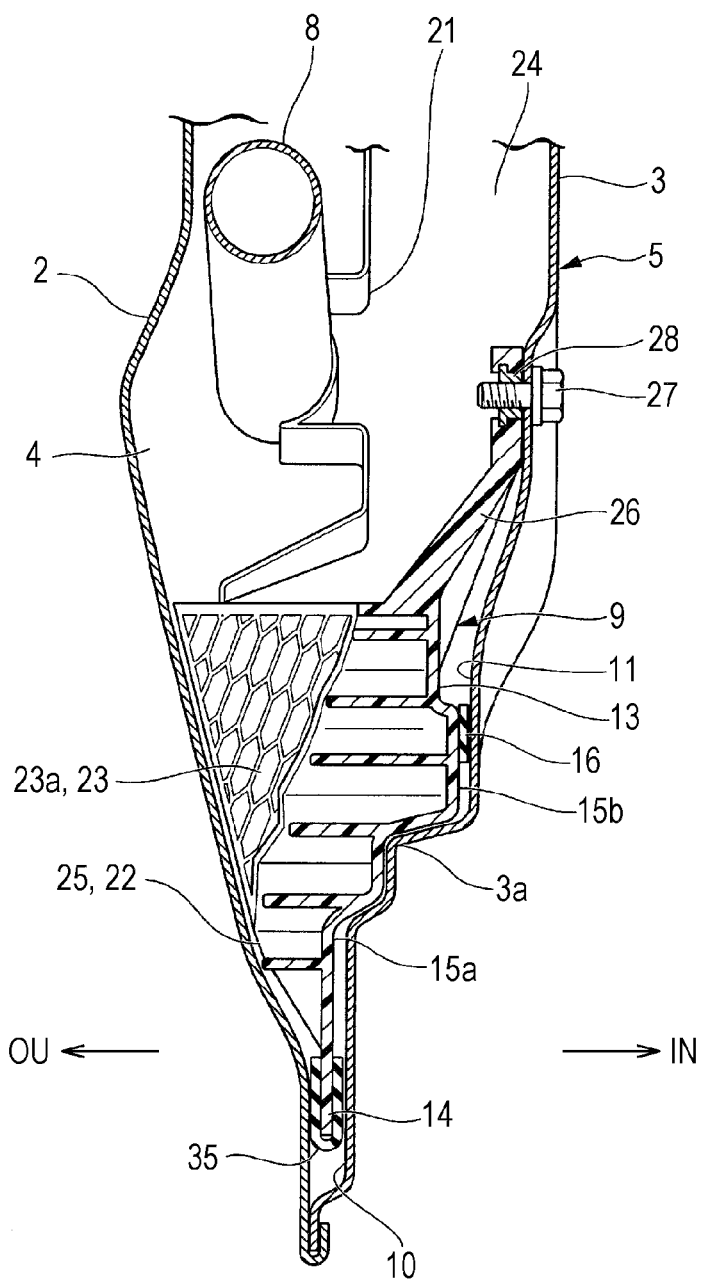
FIG. 8 is a cross-sectional view corresponding to the cross section of the vehicular door according to the exemplary embodiment of the disclosure along line VIII-VIII in FIG. 2.

As shown in FIG. 8, the transfer member body 13 includes a lower region 22 in which the lower side of the outer surface (one side surface in the door-thickness direction) abuts on, or comes close to, the inner surface of the door outer panel 2, and an inclined region 23 which is inclined in such a way that the outer surface comes apart from the inner surface of the door outer panel 2 as the outer surface goes upward from the lower region 22, and in which the inner-surface side abuts on, or comes close to, the inner surface of the door inner panel 3. The outer surface of the inclined region 23 serves as an inclined surface 23a which is inclined so as to come apart from the inner surface of the door outer panel 2 as it come apart frontward from the engaging claw 17a, 17b, 17c. That is, the inclined surface 23a of the inclined region 23 is inclined so as to come apart from the door outer panel 2 as it goes toward the upper and frontward corner portion.

Figure 7:
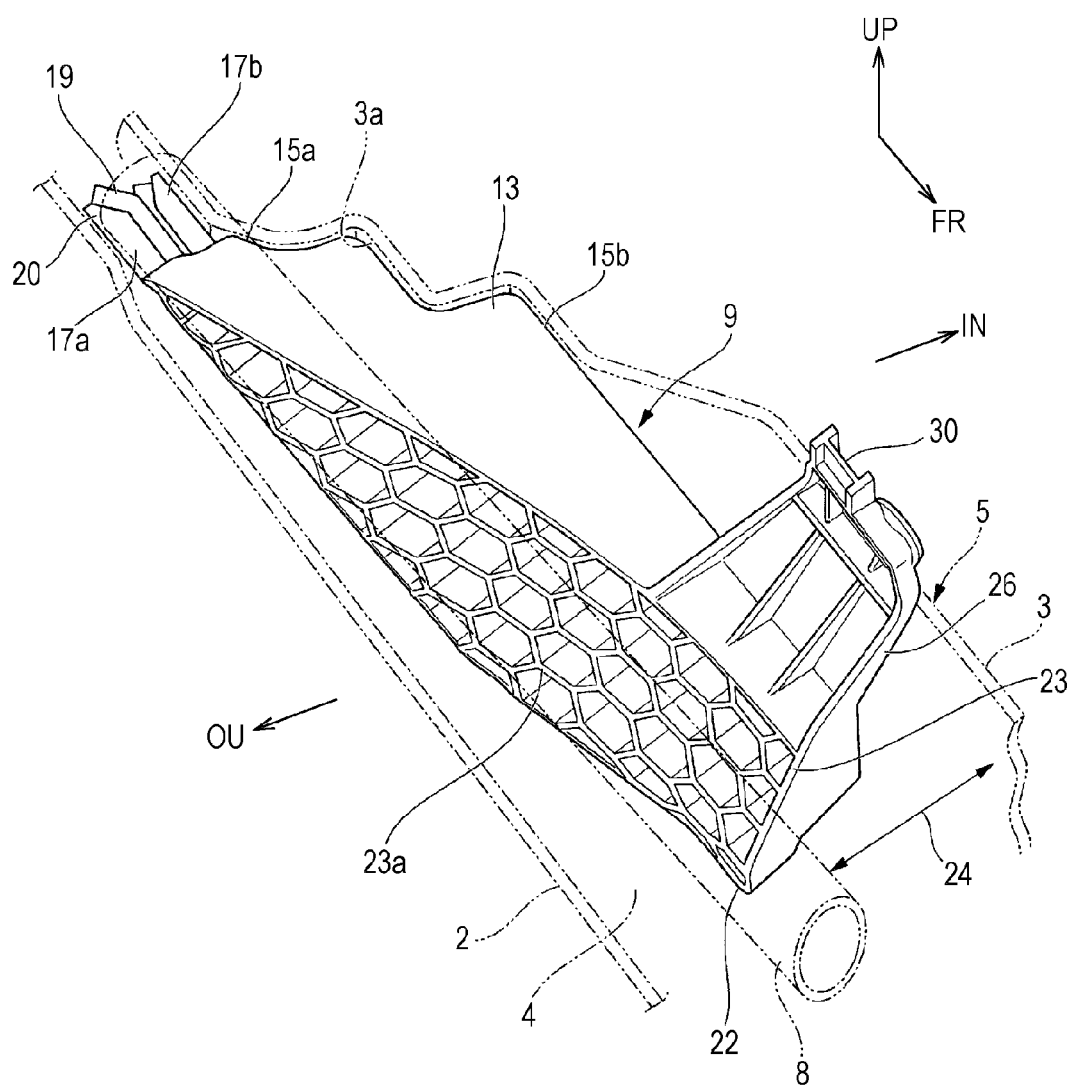
FIG. 7 is a perspective view of the load transfer member according to the exemplary embodiment of the disclosure as seen from obliquely above outside the vehicle.

The load transfer member 9 is inserted in the lower region in the door body 5 through an insertion portion 24 which is a gap between the door inner panel 3 and the lower door beam 8 as shown in FIGS. 3, 7 and 8 through, for example, the work hole 12A in the door inner panel 3 as shown in FIG. 1 from above the lower door beam 8. To achieve the insertion, the thickness of the entire region of the load transfer member 9 including the lower region 22 and the inclined region 23 is set narrower than the width of the insertion portion 24.

The inclined surface 23a is not provided on that region of the outer surface of the transfer member body 13 which extends from the rearward (on one end side in the door-widthwise direction) and lower side corner to the projection 14 and the engaging claws 17a, 17b, 17c, and this region is formed along the inner surface of the door outer panel 2 to serve as an abutting surface 25 which abuts on the inner surface of the door outer panel 2. The abutting surface 25 is provided in substantially a triangular region of the transfer member body 13 which corresponds to the lowest surface 15a of the inner surface of the transfer member body 13 shown in FIG. 4.

An extending portion 26 extending obliquely upward and toward inside of the vehicle in such a way as to be continuous with the inclined surface 23a of the transfer member body 13 is provided integrally on the front upper end of the transfer member body 13 (on the other end side in the door-widthwise direction and upper side). A nut 28 (fastening portion) with which the extending portion 26 is fixed to the door inner panel 3 at a predetermined position by a bolt 27 (fastening member) shown in FIG. 8 is placed in the vicinity of the upper end of the extending portion 26. A harness engaging piece 30 (harness engaging portion) with an H-shaped cross section for engaging a harness 29 to be disposed in the door body 5 is provided projecting upward on that side of the extending portion 26 which is located higher than the mount portion for the nut 28. The harness engaging piece 30 is engaged with an engagement hook 31 attached to the harness 29 as shown in FIG. 10.

Figure 10:
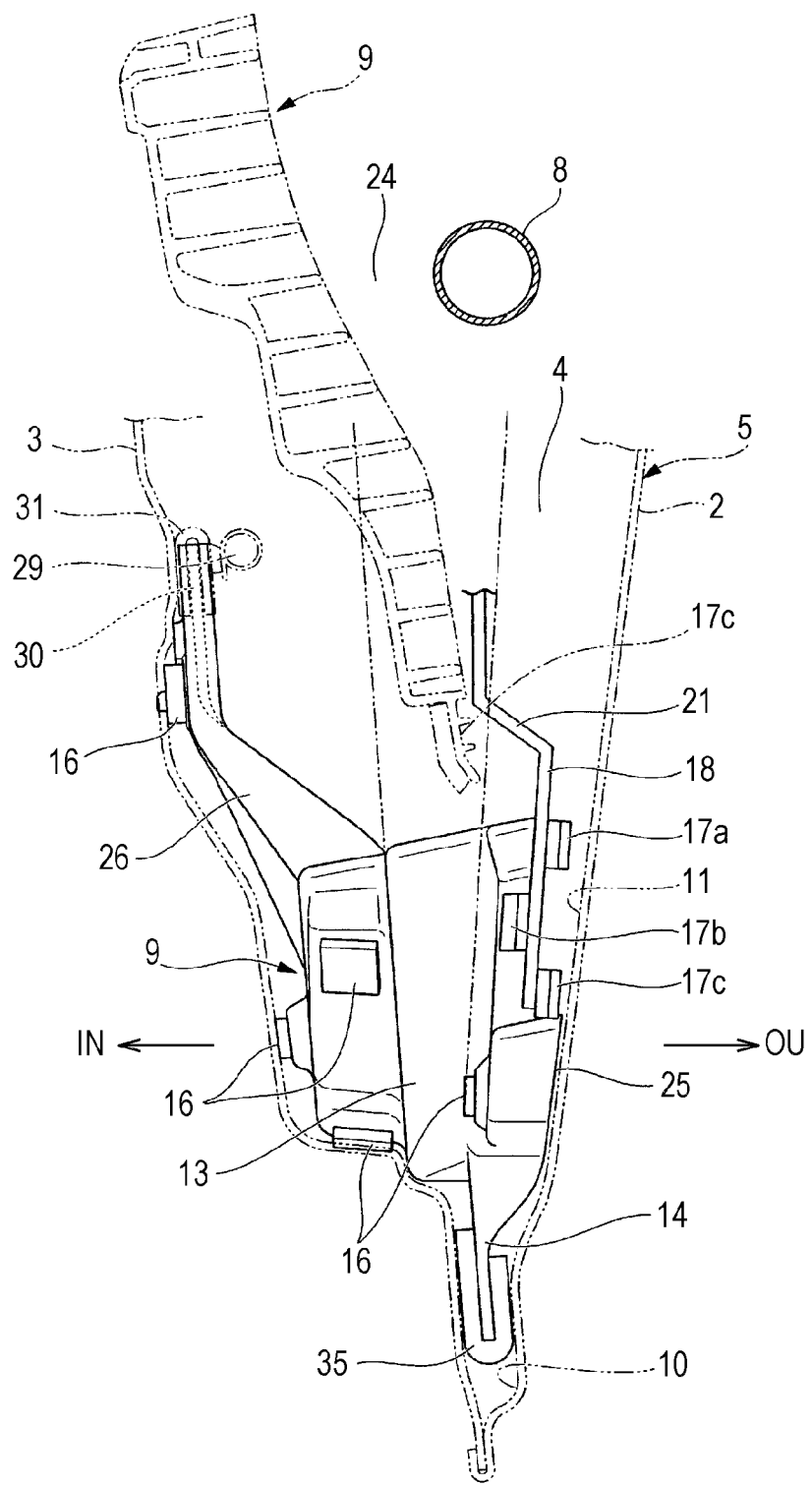
FIG. 10 is a side view of the load transfer member according to the exemplary embodiment of the disclosure as seen from the rear side of the vehicle body.
Figure 11:
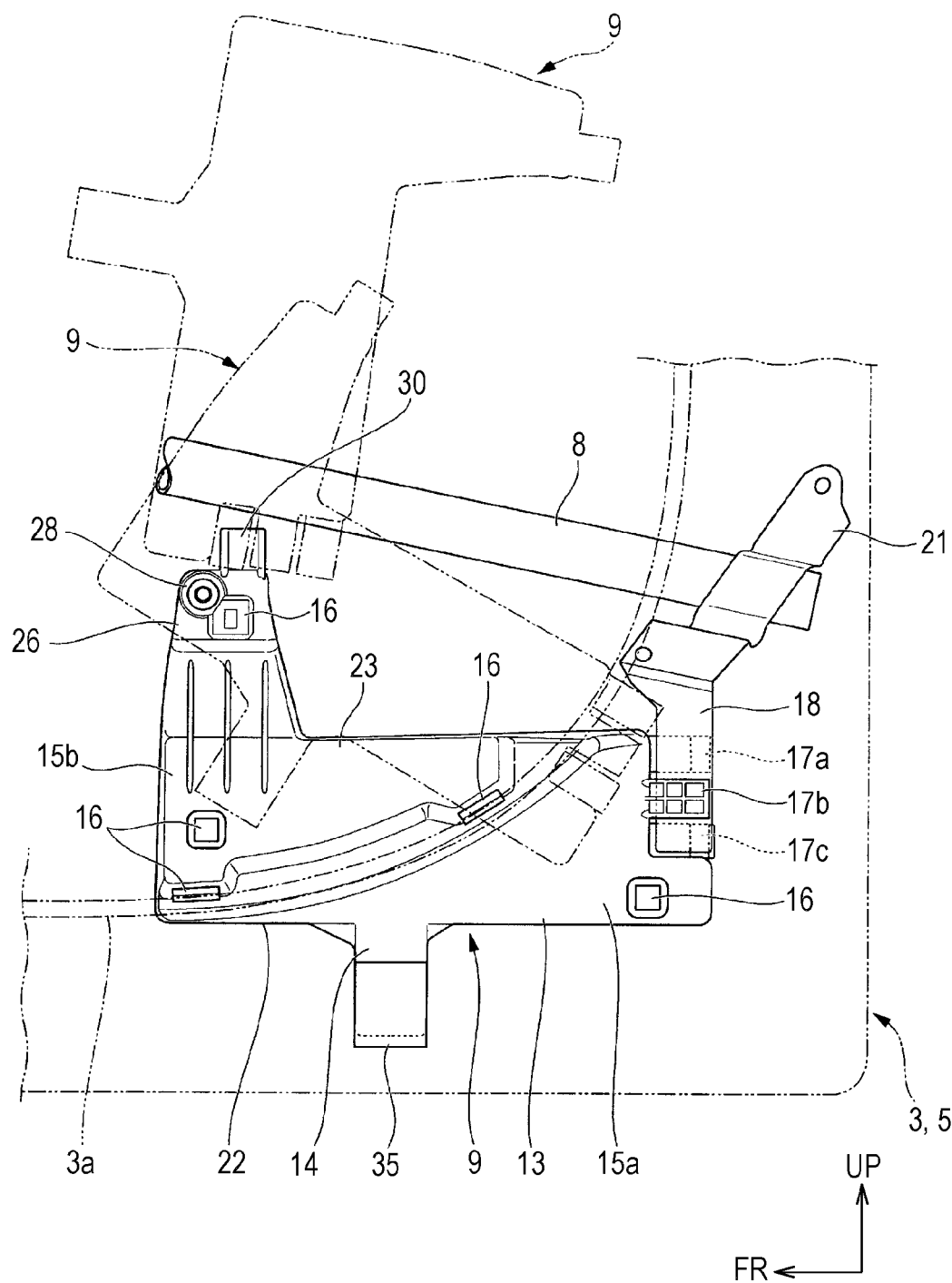
FIG. 11 is a front view similar to FIG. 2 for explaining how to mount the load transfer member according to the exemplary embodiment of the disclosure in the door body.

FIGS. 10 and 11 show how to mount the load transfer member 9 to the door body 5.

The mounting of the load transfer member 9 to the door body 5 will be described below referring to those diagrams.

The load transfer member 9 is first rotated by 90 in the front-rear direction (clockwise) so that the engaging claws 17a, 17b, 17c face downward, and is inserted in the insertion portion 24 between the door inner panel 3 and the lower door beam 8 through the work hole 12A with its lower side being slightly inclined toward the door outer panel 2.

Then, the load transfer member 9 is rotated in the front-rear direction (counter clockwise) so that the engaging claws 17a, 17b, 17c are placed closer to the fixing piece 18 in the door body 5 from the inclined state and the projection 14 is placed closer to the lower narrow-thickness portion 10 of the door body 5, and at the same time, the inclined state in the widthwise direction of the vehicle is corrected.

When the inclined state in the widthwise direction of the vehicle is corrected this way while rotating the load transfer member 9 in the front-rear direction, the outer surface of the load transfer member 9 of the transfer member body 13 on the front upper side gradually comes closer to the lower door beam 8. Since the inclined surface 23a inclined toward the front upper side of the transfer member body 13 in the direction of coming apart from the door outer panel 2 is provided on the outer surface, however, correction of the inclined state can be carried out with leeway without interfering with the lower door beam 8 at this time.

After the state of the load transfer member 9 is corrected to the normal state this way, the entire load transfer member 9 is slid toward the rear lower side of the door body 5 so that the engaging claws 17a, 17b, 17c engage with the fixing piece 18, and the projection 14 is securely fitted into the narrow-thickness portion 10 in the lower region in the door body 5.

Next, with the load transfer member 9 in this state, the upper end portion (nut 28 portion) of the extending portion 26 is fastened to the door inner panel 3 by the bolt 27.

When the load transfer member 9 is fixed into the door body 5 in the above manner, almost the entire inner surface of the transfer member body 13 abuts on, or comes close to, the inner surface of the door inner panel 3, and the abutting surface 25 on the outer surface side including the surface of the lower region 22 abuts on the inner surface of the door outer panel 2.

According to the door 1 of the embodiment, as described above, the thickness of the entire region of the load transfer member 9 including the lower region 22 and the inclined region 23 in the door-thickness direction is set narrower than the width of the insertion portion 24 between the door inner panel 3 and the lower door beam 8, so that the load transfer member 9 can easily be mounted in the door body 5 at a predetermined position without interfering with the lower door beam 8.

According to the door 1, after the load transfer member 9 is mounted in the door body 5, it is possible to cause the load transfer member 9 to abut on, or come close to, the door outer panel 2 and the door inner panel 3 in the wide-thickness portion 11 in the door body 5, so that when an impact load is applied from outside the door body 5, the load can be efficiently transferred to the frame members of the vehicle body, such as the side sill, via the door inner panel 3.

Therefore, the door 1 can improve the workability of mounting the load transfer member 9 without sacrificing its ability to transfer the impact load.

According to the door 1 of the embodiment, the inclined surface 23a of the inclined region 23 of the load transfer member 9 is inclined so as to come apart from the door outer panel 2 toward the upper and frontward corner of the transfer member body 13, so that at the time of correcting the inclined state of the load transfer member 9 while rotating the load transfer member 9 in the door body 5 in the front-rear direction when mounting the load transfer member 9, it is possible to surely avoid interference of the upper side and frontward corner portion of the transfer member body 13 with the lower door beam 8. This can enhance the workability of mounting the load transfer member 9.

Further, according to the door 1 of the embodiment, the region of the outer surface of the transfer member body 13 which extends from the rearward and lower corner to the projection 14 and the engaging claws 17a, 17b, 17c serves as the abutting surface 25 which abuts on the inner surface of the door outer panel 2. This makes it possible to sufficiently secure the abutment area of the transfer member body 13 disposed in the wide-thickness portion 11 with respect to the door outer panel 2, thereby enhancing the load transfer efficiency when an impact load is applied.

According to the door 1 of the embodiment, the load transfer member 9 is fastened by the bolt 27 and the nut 28 to the door body 5 at the upper end position of the extending portion 26 that is located farthest from the projection 14 securely held in the lower-end region of the door body 5, and from the engaging claws 17a, 17b, 17c which are engaged with in the rear-end region, so that the mount rigidity of the entire load transfer member 9 can be enhanced efficiently.

According to the door 1, the harness engaging piece 30 is provided to extend above a position immediately adjacent to the nut 28 which is the fastening portion of the extending portion 26 of the load transfer member 9, so that the harness 29 in the door body 5 can be engaged with the door body 5 with high support rigidity without providing an exclusive mount hole for fixing the harness 29 in the door inner panel 3. Therefore, the door 1 eliminates the need for providing an exclusive mount hole for fixing the harness 29 in the door inner panel 3, thus making it possible to prevent the rigidity of the door inner panel 3 from being lowered accordingly.

According to the embodiment, the fixing piece 18 for engagement of the engaging claws 17*a*, 17*b*, 17*c* of the load transfer member 9 is formed integral with the beam bracket 21 for fastening the rear end of the lower door beam 8 to the door inner panel 3, thus eliminating the need to add dedicated parts. This configuration can thus reduce the number of parts accordingly, and can simplify the structure of the door body 5.

In particular, according to the door 1 of the embodiment, the inclined surface 23*a* of the inclined region 23 of the transfer member body 13 is provided on the outer surface side which faces the door outer panel 2, and substantially the entire region of the inner surface side of the transfer member body 13 abuts on, or comes close to, the inner surface of the door inner panel 3. This makes it possible to sufficiently secure a large abutment area for the load transfer member 9 on the door inner panel 3 side when an impact load is applied, thereby enhancing the load transfer efficiency to the members of the vehicle body, such as the side sill.

The scope of the disclosure is not limited to the foregoing embodiment, and various design changes can be made without departing from the scope of the disclosure. For example, according to the embodiment, although the inclined surface 23*a* of the inclined region 23 of the transfer member body 13 is provided on the outer surface side, and the inner surface side of the transfer member body 13 abuts on, or comes close to, the inner surface of the door inner panel 3 in a wide range, the inclined surface of the inclined region of the transfer member body may be provided on the inner surface side, and the outer surface side of the transfer member body may abut on, or come close to, the inner surface of the door outer panel in a wide range.

We claim:

1. A vehicular door comprising:
    a door body comprising a door inner panel and a door outer panel, respective peripheral portions of the door inner panel and the door outer panel being joined to form a hollow portion therein, the door body having a narrow-thickness portion located in a region near a lower end of the door body, and a wide-thickness portion located above the narrow-thickness portion and wider than the narrow-thickness portion in the door-thickness direction;
    a door beam extending in a door-widthwise direction of the door body; and
    a load transfer member disposed in a lower portion of the hollow portion of the door body to transfer an impact load applied from outside the door body to the door inner panel, the load transfer member having a transfer member body disposed in the wide-thickness portion of the door body and a projection projecting downward from the transfer member body and securely held in the narrow-thickness portion,
    wherein the transfer member body includes a lower region including a first side surface abutting on, or coming close to, one of the door outer panel and the door inner panel, and an inclined region above the lower region, the first side surface of the inclined region being inclined to come apart from the one of the door outer panel and the door inner panel, and the inclined region including a second side surface opposite to the first side surface, abutting on, or coming close to, the other one of the door outer panel and the door inner panel, wherein the transfer member body includes a thickness in the door-thickness direction, in the lower region and the inclined region, being set narrower than a width of an insertion region between one of the door inner panel and the door outer panel, and the door beam.

2. The vehicular door according to claim 1, wherein the load transfer member further includes an engagement portion provided on one end side of the transfer member body in the door-widthwise direction thereof, and securely engaged with a fixing portion of the door body in the hollow portion thereof, and the first side surface of the inclined region of the transfer member body is inclined to come apart from the one of the door outer panel and the door inner panel as the first side surface goes farther apart from the engagement portion in the door-widthwise direction.

3. The vehicular door according to claim 2, wherein the transfer member body includes the lower region in a region extending from a corner of the transfer member body located on the one end side in the door-widthwise direction thereof and a lower end thereof, to the projection and the engagement portion.

4. The vehicular door according to claim 2, wherein the load transfer member includes a fastening portion fastened to the door body by a fastening member, on the other end side of the transfer member body in the door-widthwise direction and on an upper side thereof.

5. The vehicular door according to claim 4, wherein the load transfer member includes an extending portion extending upward from the transfer member body and having a harness engaging portion to engage with a harness in the door body,
    wherein the fastening portion is disposed in the extending portion, and the harness engaging portion is located higher than the fastening portion.

6. The vehicular door according to claim 2, wherein the fixing portion of the door body is formed integrally with a plate-like beam bracket fixing an end portion of the door beam to the door body.

7. The vehicular door according to claim 1, wherein the first side surface of the inclined region faces the door outer panel and the second side surface faces the door inner panel.

\* \* \* \* \*